United States Patent [19]
Osako et al.

[11] Patent Number: 5,417,618
[45] Date of Patent: May 23, 1995

[54] TOOTHED BELT

[75] Inventors: Nobutaka Osako; Takeshi Murakami; Yasunori Nakai, all of Kobe, Japan

[73] Assignee: Mitsuboshi Belting Ltd., Kobe, Japan

[21] Appl. No.: 224,284

[22] Filed: Apr. 7, 1994

[51] Int. Cl.⁶ .............................................. F16G 5/20
[52] U.S. Cl. ................... 474/205; 474/260; 474/267
[58] Field of Search ............... 474/265, 260, 266–268

[56] References Cited

U.S. PATENT DOCUMENTS

| | | | |
|---|---|---|---|
| 4,392,842 | 7/1983 | Skura et al. | 474/205 |
| 4,514,179 | 4/1985 | Skura | 474/266 X |
| 4,632,665 | 12/1986 | Skura | 474/205 |
| 5,120,280 | 6/1992 | Mizuno et al. | 474/260 |
| 5,178,586 | 1/1993 | Mizuno et al. | 474/268 X |
| 5,230,667 | 7/1993 | Nakajima et al. | 474/268 X |
| 5,306,213 | 4/1994 | Nakajima et al. | 474/205 |
| 5,310,386 | 5/1994 | Mizuno et al. | 474/205 |

FOREIGN PATENT DOCUMENTS

| | | |
|---|---|---|
| 4215142 | 1/1993 | Germany . |
| 36642 | 3/1980 | Japan . |
| 159827 | 2/1987 | Japan . |
| 183147 | 4/1987 | Japan . |
| 8948 | 11/1992 | Japan . |
| 4341639 | 11/1992 | Japan . |

*Primary Examiner*—Roger J. Schoeppel
*Attorney, Agent, or Firm*—Wood, Phillips, VanSanten, Clark & Mortimer

[57] ABSTRACT

A power transmission belt having a body with a length and inside and outside surfaces. A plurality of teeth are spaced lengthwise along the belt body and define at least a portion of one of the inside and outside surfaces of the belt body. A fabric layer with weft yarns is provided on the one of the inside and outside surfaces of the belt body. At least a portion of the weft yarns include a plurality of filaments of para-aramid fiber having a thickness of 0.3 to 1.2 denier.

24 Claims, 1 Drawing Sheet

TOOTHED BELT

BACKGROUND OF THE INVENTION

1. Field of the Invention

This invention relates to power transmission belts and, more particularly, to a toothed belt having a fabric layer thereon that resists tooth abrasion and chipping, particularly in a high temperature environment in which the belt is heavily tensioned or under a heavy load.

2. Background Art

Toothed power transmission belts are well known in the art. It is known to construct the teeth and a backing layer on these belts from a rubber blend including chloroprene rubber. It is also known to incorporate into these belts load carrying members made from glass fiber cord or aramid fiber cord. The individual fibers in these cords are adhered together using an RFL (resorcinol-fonnalin-latex) solution containing a latex component of vinylpyridine latex from the SBR group. It is also known to place a fabric covering layer on the inside surface of the belt over the belt teeth. One type of fabric has a woven warp and weft, with the latter being a crimped nylon material.

The above type of toothed belt is what is conventionally used for vehicle OHC (overhead cam) drive belts. These belts are typically operated at elevated temperatures and even more so of late by reason of the trend towards use of these belts in small front engine compartments on front wheel drive vehicles. The conventional belts made from chloroprene rubber and operating in this environment are prone to a number of defects. Tooth chipping may be caused by cracks developed in the belt backing and at the tooth flank. Further, glass load carrying members tend to rapidly degrade under repeated flexing of the belt at these high temperatures. Either belt defect may lead to premature belt failure.

One attempted solution to the cracking and chipping problem discussed above, has been to modify the rubber composition defining the belt teeth and backing layer. In Japanese Patent Publication JP-A-62-159827, different rubber compositions are disclosed to alleviate the above problems and thereby prolong the belt life in a vehicle application. It is taught therein to use a rubber blend including chlorosulfonated polyethylene (CSM) and hydrogenated nitrile rubber (HNBR) prepared by hydrogenating a copolymer of acrylonitrilebutadiene.

It is further known to change the characteristics of the load carrying members and fabric coveting layer and to combine these improved load carrying members and covering layer with the modified rubber blends to eliminate cracking and chipping in the toothed belts. The coveting layer reinforces the tooth flank that is subjected to a concentrated stress with the belt under a heavy load and/or highly tensioned. However, if the covering layer abrades, the reinforcing effect of the covering layer is reduced, as a result of which the concentrated stresses at the tooth flanks induce chipping and cracking.

In Japanese Patent Publication JP-A-55-36642, a canvas fabric layer is disclosed which is woven using polyester yarn or aramid fiber for one of the warp or weft and 6-nylon or 6,6-nylon for the other of the warp and weft. It is explained that this canvas covering layer improves heat resistance.

In Japanese Utility Model Publication JP-U-62-183 147, a fabric covering layer is disclosed wherein the weft contains at least woven woolly finished yarn of aramid fiber and urethane elastic yarn.

Another fabric cover layer aimed at improving resistance to abrasion and tooth chipping is disclosed in Japanese Patent Publication JP-A-4-8948. The fabric is described therein as a) a combined twisted yarn of aramid spun yarn and urethane elastic yarn for the weft and b) filament yarn of an aliphatic group fiber or aramid fiber for the warp.

A fabric covering layer using a conventional woolly finished yarn of aramid fiber has an irregular, towel-like surface. The woolly finished yarn produces a random thickness. This results from the inability to produce uniform twists due to the temperature variations during processing and the rigidity of the fiber. The irregular surface of the canvas covering layer results in a non-uniform PLD value over the length of the belt (the PLD value is the distance between the pitch line passing through the center of the load carrying cords and the belt bottom land). A further consequence of this is that belts made from a single mold may vary in length.

Under normal operating conditions, a fabric cover layer which has a combined twisted yarn of aramid spun yarn and urethane elastic yarn as the weft improves abrasion resistance and resistance to cracking and tooth chipping. However, when this type of belt is made in a narrow form or used under heavy loads, or when the variation of load is significant as in the case of a diesel engine drive, the abrasion on the teeth becomes particularly severe. The problem is aggravated with the belt operating in a high temperature environment, i.e. 100°–140° C. As a result, the tooth flanks tend to crack and chip after a relatively short period of operation by reason of the stress concentration thereat.

Another problem with conventional belts using cover fabric is that the cover fabric employs 6-nylon yarns or 6,6-nylon yarns which may melt and adhere to a cooperating pulley as the belt operates for long periods at temperatures in the 100°–140° C. temperature range. This causes the cover layer to wear down prematurely which leads to crack formation in the teeth.

SUMMARY OF THE INVENTION

The present invention is specifically directed to overcoming the above enumerated problems in a novel and simple manner.

It is one objective of the present invention to provide a toothed power transmission belt with teeth which have good resistance to abrasion and chipping so that the belt will have a long life even when operated in high temperature environments in which the belt is under high tension and transmits a heavy load.

In one form, a power transmission belt is provided having a belt body with a length and inside and outside surfaces. A plurality of teeth are spaced lengthwise along the belt body and define at least a portion of one of the inside and outside surfaces of the belt body. A fabric layer with weft yarns is provided on the one of the inside and outside surfaces of the belt body. At least a portion of the weft yarns include a plurality of filaments of para-aramid fiber having a thickness of 0.3 to 1.2 denier.

The fabric layer provides the necessary reinforcement of the teeth with the belt operating in environments at temperatures between 100°–140° C. Since the aramid fibers have no apparent melting point, there is no tendency of the fibers to melt and thereby adhere to cooperating pulleys, thereby compromising the integrity of the cover layer.

The fabric layer can cover all or part of the one of the inside and outside surfaces of the belt body.

At least a portion of the weft yarns may include multi-filament yarns defined by at least para-aramid fiber and meta-aramid fiber.

The meta-aramid fiber may be a spun yarn.

In one form, the fabric layer includes warp yarns, at least a portion of which include para-aramid fiber and meta-aramid fiber.

The warp yarn may further include a filament yarn of polyamide, polyvinyl-alcohol and polyester. The polyamide may be one of 6-nylon and 6,6-nylon.

In one form, the weft yarns include para-aramid fiber that is present in an amount from 20 to 80 weight percent of the total weft yarns and meta-aramid fiber that is present in an amount from 80 to 20 weight percent of the total weft yarns.

The weft yarn may be a twisted yarn made up of multi-filament yarn of para-aramid fiber, spun yarn of meta-aramid fiber, and urethane elastic yarn.

In another form, the weft yarns are twisted yarns made up of multi-filament yarn of para-aramid fiber, aliphatic group fiber yarn, and urethane elastic yarn.

The weft yarns may be yarns made from fiber sold under at least one of the commercial trademarks NOMEX, KONEX, KEVLAR, TECHNORA and TWARON The fabric layer may be at least one of a plain weave fabric, a twill fabric, and a satin fabric.

For longitudinal strength, a plurality of longitudinally extending load carrying cords are provided in the belt body.

The belt body is defined by a rubber that may be at least one of hydrogenated nitrile rubber, chlorosulfonated polyethylene (CSM), alkylated and chlorosulfonated polyethylene (ACSM), and chloroprene rubber.

In another form of the invention, a power transmission belt is provided having a belt body with a length and inside and outside surfaces, a plurality of teeth spaced lengthwise along the belt body and a fabric layer on the inside surface of the belt body and having woven warp and weft yarns. The weft yarns include a plurality of filaments of para-aramid fiber having a thickness of 0.3 to 1.2 denier.

DETAILED DESCRIPTION OF THE DRAWINGS

Figure 1:
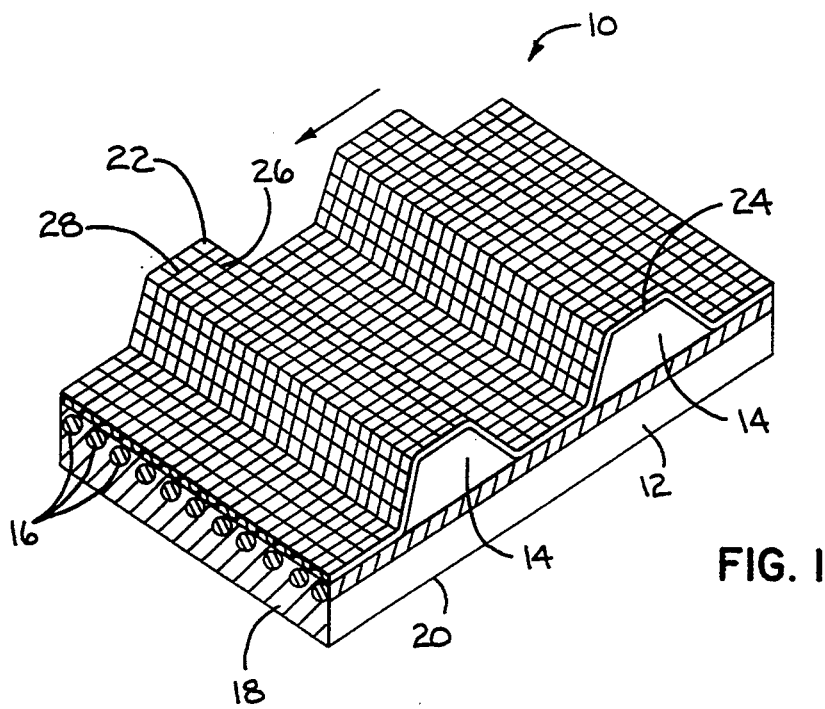
FIG. 1 is a fragmentary, perspective view of a toothed belt, with a fabric cover layer according to the present invention on a surface thereof.

In FIG. 1, a toothed power transmission belt, made according to the present invention, is shown at 10. The belt 10 has a body 12 which has laterally extending teeth 14 spaced equidistantly along the length of the belt 10. A plurality of laterally spaced, longitudinally extending, load carrying cords 16 are embedded in a backing layer 18 which defines the outside surface 20 of the belt 10. The load carrying cords 16 may be made, for example, from glass fiber cord or aramid fiber cord. A fabric cover layer 22 is provided on the inside surface 24 of the belt body 12 and over the teeth 14, which define a portion of the inside surface 24.

The teeth 14 and backing layer 18 are preferably made from rubber with good thermal aging resistance. Suitable rubber materials include hydrogenated nitrile rubber, chlorosulfonated polyethylene (CSM), alkylated and chlorosulfonated polyethylene (ACSM), and chloroprene rubber.

In the event hydrogenated nitrile rubber is used, it is preferred that the percentage of hydrogenation be more than 80%, and more preferably more than 90%, to provide optimum heat resistance and ozone resistance. Hydrogenated nitrile rubber having a hydrogenation of less than 80% has less than the desired heat resistance and ozone resistance.

The fabric cover layer 22 is preferably canvas that is one of a plain weave fabric, twill fabric, or satin fabric, with woven warp yarns 26 and weft yarns 28.

According to the invention, the weft yarns 28 contain multi-filament yarn with combined unfinished filaments of para-aramid fiber having a thickness of 0.3 to 1.2 denier. The para-aramid fibers are present preferably in an amount of 20 to 80 weight percent of the total quantity of weft yarns 28.

The multi-filament weft yarn made with para-aramid fiber may also contain a yarn that is made from meta-aramid fiber. One exemplary weft yarn composition is a combined twisted yarn, made from three different fibers—multi-filament yarn of para-aramid fiber, spun yarn of meta-aramid fiber, and urethane elastic yarn.

Another suitable weft yarn 26 is a combined twisted yarn made from three twisted fibers—multi-filament yarn of para-aramid fiber, aliphatic group fiber yarn (6-nylon, 6,6-nylon, polyester, polyvinylalcohol, etc.), and urethane elastic yarn.

The multi-filament yarn of aramid fiber can be made by combining one or more tows of unfinished filaments each having a thickness of 0.3 to 1.2 denier. A suitable multifilament yarn is one made up of fiber currently being sold under the commercial trademarks KEVLAR, TECHNORA, and TWARON.

If the thickness of the unfinished filaments is less than 0.3 denier, the tensile strength of the belt is significantly diminished as is the resistance to abrasion resulting from repeated contact by the belt 10 with cooperating pulleys.

If the thickness of the unfinished filaments exceeds 1.2 denier, the rigidity of the yarn along the direction of the multi-filament yarn of para-aramid fiber increases sufficiently that the surface of the cover layer 22 becomes wrinkled during formation. More particularly, during the adhesion treatment of the woven yarn, the thicker yarns rigidify to the point that the weaving pattern between the warp and weft yarns is disturbed. This produces wrinkles in the cover layer 22. This condition is not desirable, particularly in belts which require a uniform PLD value.

When the content of multi-filament yarn of para-aramid fiber is less than 20 weight percent, the cover layer 22 does not afford the necessary tooth reinforcement and the belt teeth 14 tend to chip with the belt 10 running under a heavy load. When the content of the multi-filament yarn of para-aramid fiber is greater than 80 weight percent, the rigidity of yarn along the direction of the multi-filament yarns of para-aramid fiber becomes excessive. This impairs the ability to form a canvas cover layer 22 with a uniform thickness.

A preferred form of yarn of meta-aramid fiber, which can be combined with the multifilament yarn of the para-aramid fiber in the weft, may be made utilizing fiber sold commercially under the trademarks NOMEX and KONEX. A spun yarn is most preferable.

In one form, the multi-filament yarn using para-aramid fiber and meta-aramid fiber has para-aramid fiber present in an amount ranging from 20 to 80 weight percent, with the yarn of meta-aramid fiber being present in an amount ranging from 80 to 20 weight percent. With the weft yarn made from combined para-aramid fiber and meta-aramid fiber, it is preferred that the para-aramid fiber be present in an amount of 10 to 100 weight percent, with the meta-aramid fiber present in an amount less than 90 weight percent. More preferably, the para-aramid fiber is present in an amount from 30 to 100 weight percent with the meta-aramid fiber present in an amount less than 70 weight percent. This combination makes the fabric cover layer 22 durable even under running conditions at elevated temperatures with the belt heavily loaded and highly tensioned. This combination also effectively resists abrasion on the surfaces of the teeth 14 and effects reinforcement thereof. By adjusting the relative proportions of para-aramid fiber and meta-aramid fiber in the multi-filament yarn, a uniform warp directions is balanced to provide a uniform thickness canvas.

The use of aramid fiber is desirable in that it has no apparent melting point, as compared to conventional nylon fibers. As a result, it does not adhere to cooperating pulleys and pull off of the belt during operation.

Once the fabric layer 22 is formed by weaving, it is treated with one of an RFL solution, isocyanate solution, or epoxy solution. The RFL solution is prepared by mixing an initial condensate of resorcinol and formalin with latex. The latex is prepared from a styrene-butadiene-vinylpyridine ternary copolymer, a hydrogenated nitrile rubber, chlorosulfonated polyethylene, epichlorohydrin, or the like.

The improved performance of the belt 10, made according to the present invention, is demonstrated through the following testing.

Construction of Inventive and Comparative Belt Samples

Fabric Cover Layer

Four belt samples (Nos. 1, 2, 3, 4) with fabric cover layers (T-1, T-2, T-3, T-4) according to the present invention were constructed for testing side-by-side with two comparative belt samples (Nos. 1 and 2) having conventional-type cover layers (T-5 and T-6). The composition of the inventive and comparative belt samples is set out in Table 1.

TABLE 1

| | Inventive Belt Samples | | | | Comparative Belt Samples | |
|---|---|---|---|---|---|---|
| | Belt No. | | | | | |
| | 1 | 2 | 3 | 4 | 1 | 2 |
| | Canvas No. | | | | | |
| | T-1 | T-2 | T-3 | T-4 | T-5 | T-6 |
| Weft yarn structure D = denier | TECHNORA (64.8 wt %) 200D/2 yarns (0.75D/filament) CORNEX (28.7 wt %) 30's/1 yarn* SPANDEX (6.5 wt %) 140D/1 yarn | TECHNORA (33.7 wt %) 200D/1 yarn (0.75D/filament) CORNEX (59.6 wt %) 30's/2 yarns SPANDEX (6.7 wt %) 140D/1 yarn | TECHNORA (61.5 wt %) 200D/2 yarns (0.75D/filament) 6,6 Nylon (32.3 wt %) 210D/1 yarn (6D/filament) SPANDEX (6.2 wt %) | TECHNORA (46.5 wt %) 200D/2 yarns (0.75D/filament) 6,6 Nylon (48.8 wt %) 210D/2 yarns (6D/filament) SPANDEX (4.7 wt %) | CORNEX (93.0 wt %) 30's/3 yarns SPANDEX (7.0 wt %) 140D/1 yarn | 6,6 Nylon (94.0 wt %) 210D/3 yarns (6D/filament SPANDEX (6.0 wt %) 140D/1 yarn |
| Weft Number of twists (per 10 cm) | 30 | 30 | 30 | 30 | 30 | 30 |
| Weft Yarn density (Number of yarns/5 cm) | 120 | 120 | 120 | 120 | 120 | 120 |
| Warp yarn structure D = denier | TECHNORA 200D/1 yarn 1.5D/filament | TECHNORA 200D/1 yarn (1.5D/filament) | TECHNORA 200d/1 yarn (1.5D/filament) | TECHNORA 200D/1 yarn 1.5D/filament) | TECHNORA 200D/1 yarn 1.5D/filament) | TECHNORA 200D/1 yarn (1.5D/filament) |
| Warp Number of twists (per 10 cm) | 15 | 15 | 15 | 15 | 15 | 15 |
| Type of Weaving | 2/2 twill fabric | 2/2 twill fabric | 2/2 twill fabric | 2/2 twill fabric | 2/2 twill fabric | 2/2 twill fabric |

*1 yarn of 30's (spun yarn)

thickness cover layer 22 can be formed.

A preferred composition for the warp yarns 26 includes a filament yarn of aramid fiber consisting of para-aramid fiber and meta-aramid fiber, a filament yarn of polyamide, such as 6-nylon and 6,6-nylon, polyvinyl-alcohol, and polyester. With this warp yarn combined with a weft yarn having yarn of unfinished filaments of para-aramid filament fiber, the rigidity in both weft and A 2/2 twill cover fabric was prepared for each belt using a warp filament yarn of 200 denier by accumulating unfinished filaments of para-aramid fiber having a thickness of 1.5 denier per filament.

The weft was constructed for each belt using combined twisted yarns having a composition listed in Table 1.

The warp and weft yarns were combined by weaving the yarns with a density of 110 warp yarns/5 cm and 120 weft yarns/5 cm.

The resulting woven canvas cover layer was vibrated in water to be shrunk to approximately half its initial width. The canvas was then dipped into a processing bath prepared by dissolving a rubber blend, described in Table 2, below, in methyethylketone and isocyanate. The canvas was then dried, with the resulting canvas having a thickness of 0.9 mm. The weft was aligned in the longitudinal direction of the belts that were tested.

TABLE 2

| Ingredient | Weight parts |
| --- | --- |
| ZETPOL 2020 | 100 |
| Hydrogenated NBR (degree of hydrogenation: 90%) (manufactured by Nippon Zeon Co., Ltd.) | |
| Zinc oxide | 5 |
| Stearic acid | 1 |
| Carbon black FEF | 40 |
| Anti-aging agent | 1 |
| N-phenyl-N'-isopropyl-P-phenylenediamine (manufactured by Seiko Kagaku Co., Ltd.) | |
| Thiokol TP-95 | 5 |
| Curing accelerator CZ | 1 |
| N-cyclohexyl-2-benzothiazyl sulfonamide (manufactured by Sanshin Kagaku Co., Ltd.) | |
| Curing accelerator TT | 1 |
| Tetramethylthiuram disulfide (manufactured by Sanshin Kagaku Co., Ltd.) | |
| Sulfur | 0.5 |

When unfinished filaments of para-aramid fiber having a thickness of 1.5 denier were used for the weft yarns, the canvas did not shrink uniformly as it was vibrated in water. The resulting canvas had a wrinkled surface with a non-uniform thickness, which made it unsuitable for a cover fabric layer.

The Load Carrying Cords

The load carrying cords were constructed for each belt by combining three strands, each of which had approximately 200 glass filaments. The glass filaments were prepared by melt spinning the filaments to a monofilament thickness of approximately 9 $\mu$m. They were subsequently treated with a silane coupling agent. Each of the collected strand samples was dipped into each of the RFL solutions shown in Table 3, below, dried at 130° C. for two minutes, and baked at 250°–300° C. for two minutes.

TABLE 3

| RFL Ingredient | Weight Parts |
| --- | --- |
| Resorcinol | 110 |
| Formalin (37%) | 81 |
| Caustic soda | 1 |
| VP latex 40% | 4,000 |
| SBR latex 40% | 1,000 |
| Water | 5,500 |

The treated strand samples were then twisted to prepare two types of twisted yarns. The first type was an S-twist yarn formed by applying a primary twist at a rate of approximately 12 twists/10 cm in the S direction. The other was a Z-twisted yarn formed by applying a primary twist at the same rate in the Z direction.

Thirteen S-primary twist yarns were collected and further treated by applying a secondary Z-twist at a rate of approximately 8 twists/10 cm to form a Z-twist glass fiber cord. Similarly, thirteen Z-primary twist yarns were collected and treated by applying a secondary S-twist at a rate of approximately 8 twists/10 cm to form an S-twist glass fiber cord.

Each of the S- and Z-twist glass fiber cords was treated with an RFL solution. A coating solution was prepared by dissolving the rubber blend in a solvent and adding isocyanate. Each prepared sample cord was dipped into the coating solution, to enhance the adherence of the RFL-treated glass fiber cords to the belt teeth 14 and to the cover fabric layer 22, and dried.

Belt Fabrication

Each belt was formed by initially applying the fabric covering layer 22 around a mold. The load carrying cords 16 were wound in turn around the fabric layer 22. A rubber sheet, having the composition shown in Table 2, was wound around the fabric layer 22 to define a belt sleeve. The belt sleeve was then cured and subsequently cut to define individual belts having a desired width.

Each of the belts had a size of 105S8M19. The tooth profile on each belt was STPD type. Each belt had 105 teeth, a width of 19.1 mm, and a pitch of 8 mm.

Test Set Up No. 1

Figure 2:
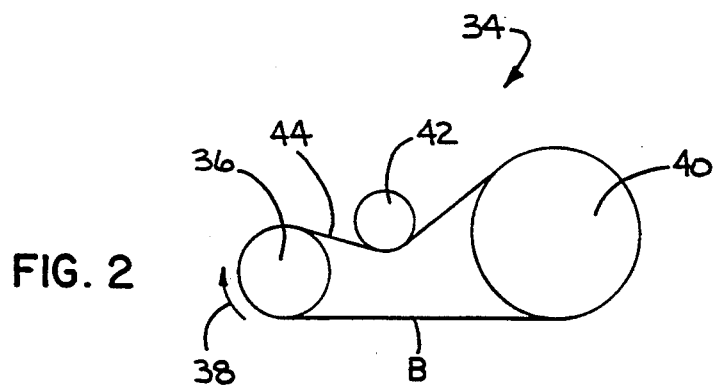
FIG. 2 is a schematic, side elevation view of a dynamic test setup for measuring running time before belt tooth chipping occurs in a high tension, high temperature environment.

In FIG. 2, a dynamic test setup is shown at 34 for determining the running time for each tested belt before tooth chipping occurred, with the belts operated under high tension and at an elevated temperature. The test setup 34 includes a drive pulley 36, which was driven in the direction of the arrow 38. The drive pulley 36 has 21 teeth. A driven pulley 40, with 42 teeth, was used. A tensioning pulley 42, with a diameter of 52 mm, was borne against the outside surface 44 of each belt B trained around the drive pulley 36 and driven pulley 40.

The drive pulley 36 was driven at a speed of 7200 RPM, with the load on the driven pulley being 5 hp and an initial tension on the belt of 30 kgf. The system 34 was operated in an environment at 120° C. The belts B were run until chipping of the belt teeth occurred. The results are summarized in Table 4, below.

TABLE 4

| | Inventive Samples | | | | Comparative Samples | |
| --- | --- | --- | --- | --- | --- | --- |
| | Belt No. | | | | | |
| | 1 | 2 | 3 | 4 | 1 | 2 |
| | Canvas No. (From Table 1) | | | | | |
| | T-1 | T-2 | T-3 | T-4 | T-5 | T-6 |
| Time before chipping occurs on a tooth with belt running at high tension and high temperature (hrs.) | 1685 | 1740 | 1360 | 790 | 1875 | 425 |
| Time before chipping occurs on a tooth with belt running under heavy load and at high temperature (hrs.) | 478 | 235 | 455 | 320 | 97 | 110 |

Figure 3:
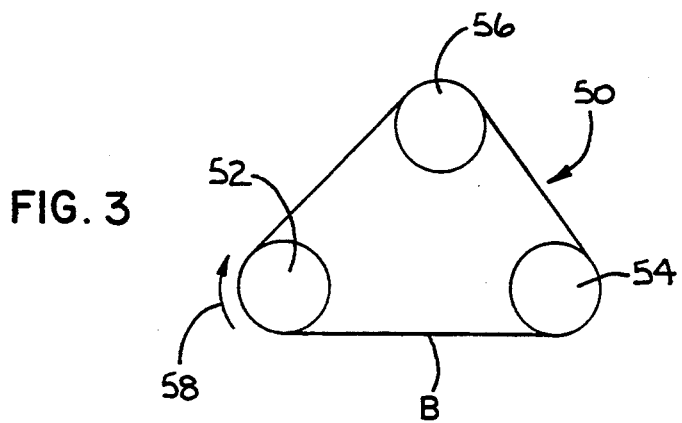
FIG. 3 is a schematic, side elevation view of a dynamic test setup for measuring running time before belt tooth chipping occurs under a heavy load in a high temperature environment.

In FIG. 3, a dynamic test setup is shown at 50 for determining total running time for tested belts before chipping of the teeth occurred. The individual belts were run under a heavy load and at high temperatures. The test setup 50 includes a drive pulley 52, driven pulley 54 and an idler pulley 56, about which each test belt B was trained. The drive pulley 52 has 21 teeth, the driven pulley 21 teeth, and the idler pulley 21 teeth.

The drive pulley 52 was operated in the direction of arrow 58. The pulleys 52, 54, 56 were positioned so that the driven pulley 54 had 6 teeth mating with the teeth on the test belt B.

The drive pulley 58 was operated at 6,000 RPM with the load on the driven pulley of 7 hp. The system was operated at an ambient temperature of 120° C. For each tested belt B, the total running time was determined before chipping of teeth on the belt B occurred. The results of this test are shown in Table 4.

Test Results

As can be seen from Table 4, the running time before tooth chipping occurred in the high tension test setup 34 was longer for the inventive belts than for the comparative belt samples. Similarly, the running time before tooth chipping was longer for the inventive belts than the comparative sample belts in the high load test setup 50.

More particularly, the comparative belt sample No. 1 showed the highest durability at an elevated temperature but gave the lowest durability under heavy load at an elevated temperature. It is believed that the reason this occurred is that the weft of the cover layer fabric, which was a spun yarn of meta-aramid fiber, had inferior strength. Further, the weft yarns did not contain filament yarn of para-aramid fiber which has excellent strength, as a result of which the tooth flank was easily deformed under a concentrated stress so that premature chipping thereof was induced.

The inventive belt samples Nos. 1 and 2 had a higher level of durability under high tension and load at an elevated temperature than the inventive belt samples Nos. 3 and 4. It is believed that the difference in performance is attributable to the fact that the cover fabric of belt samples Nos. 1 and 2 had weft yarns containing both para-aramid fiber and meta-aramid fiber, with no nylon fiber, as a result of which abrasion resistance was improved. The foregoing disclosure of specific embodiments is intended to be illustrative of the broad concepts comprehended by the invention.

We claim:

1. A power transmission belt comprising:
   a belt body having a length and inside and outside surfaces;
   a plurality of teeth spaced lengthwise along the belt body and defining at least a portion of one of the inside and outside surfaces of the belt body; and
   a fabric layer with weft yarns on the one of the inside and outside surface of the belt body,
   whereby at least a portion of the weft yarns comprise a plurality of filaments of para-aramid fiber having a thickness of 0.3 to 1.2 denier.

2. The power transmission belt according to claim 1 wherein the fabric layer fully covers the one of the inside and outside surfaces of the belt body.

3. The power transmission belt according to claim 1 wherein at least a portion of the weft yarns comprise multi-filament yarns including at least para-aramid fiber and meta-aramid fiber.

4. The power transmission belt according to claim 3 wherein the meta-aramid fiber is a spun yarn.

5. The power transmission belt according to claim 3 wherein the weft yarns comprise yarns made from fibers sold under at least one of the commercial trademarks NOMEX, KONEX, KEVLAR, TECHNORA and TWARON.

6. The power transmission belt according to claim 1 including a plurality of longitudinally extending load carrying members in the belt body.

7. The power transmission belt according to claim 1 wherein the weft yarns comprise para-aramid fibers that is present in an amount from 20 to 80 weight percent of the total weft yarns and meta-aramid fiber that is present in an amount from 80 to 20 weight percent of the total weft yarns.

8. The power transmission belt according to claim 1 wherein the belt body is defined by a rubber material that is at least one of hydrogenated nitrile rubber, chlorosulfonated polyethylene (CSM), alkylated and chlorosulfonated polyethylene (ACSM), and chloroprene rubber.

9. The power transmission belt according to claim 1 wherein the fabric layer comprises at least one of plain weave fabric, twill fabric, and satin fabric.

10. The power transmission belt according to claim 1 wherein the para-aramid fiber is present in an amount from 20 to 80 weight percent of the total weft yarns.

11. The power transmission belt according to claim 1 wherein the weft yarns comprise a twisted yarn made up of multi-filament yarn of para-aramid fiber, spun yarn of meta-aramid fiber, and urethane elastic yarn.

12. The power transmission belt according to claim 1 wherein the weft yarns comprise a twisted yarn made up of multi-filament yarn of para-aramid fiber, aliphatic group fiber yarn, and urethane elastic yarn.

13. The power transmission belt according to claim 1 wherein the fabric layer includes warp yarns and at least a portion of the warp yarns comprise at least one of para-aramid fiber and meta-aramid fiber.

14. A power transmission belt comprising:
   a belt body having a length and inside and outside surfaces;
   a plurality of teeth spaced lengthwise along the belt body and defining at least a portion of the inside surface of the belt body; and
   a fabric layer on the inside surface of the belt body having woven warp and weft yarns,
   whereby the weft yarns comprise a plurality of filaments of para-aramid fibers having a thickness of 0.3 to 1.2 denier.

15. The power transmission belt according to claim 14 wherein the weft yarns comprise a multi-filament yarn including at least para-aramid fiber and meta-aramid fiber.

16. The power transmission belt according to claim 15 wherein the meta-aramid fiber is a spun yarn.

17. The power transmission belt according to claim 14 wherein the warp yarns comprise yarns made of at least one of para-aramid fiber and meta-aramid fiber.

18. The power transmission belt according to claim 17 wherein the warp yarns further comprise a filament yarn of polyamide, polyvinylalcohol and polyester.

19. The power transmission belt according to claim 18 wherein the polyamide is one of 6-nylon and 6,6-nylon.

20. The power transmission belt according to claim 14 wherein the para-aramid fiber is present in an amount from 20 to 80 weight percent of the total weft yarns.

21. The power transmission belt according to claim 14 wherein the weft yarns comprise twisted yarns of the para-aramid fiber and at least one of spun yarn of meta-aramid fiber, urethane elastic yarn, and aliphatic group fiber yarn.

22. The power transmission belt according to claim 14 wherein the belt body is defined by a rubber material that is at least one of hydrogenated nitrile rubber, chlorosulfonated polyethylene (CSM), alkylated and chlorosulfonated polyethylene (ACSM), and chloroprene rubber.

23. The power transmission belt according to claim 14 wherein the fabric layer is at least one of plain weave fabric, twill fabric, and satin fabric.

24. The power transmission belt according to claim 14 including a plurality of longitudinally extending load carrying members in the belt body.

* * * * *